(12) United States Patent
Santini et al.

(10) Patent No.: US 10,022,660 B2
(45) Date of Patent: Jul. 17, 2018

(54) FILTERING CHAMBER FOR GAS TURBINES AND METHOD OF MAINTENANCE THEREOF

(71) Applicant: Nuovo Pignone Srl

(72) Inventors: Marco Santini, Florence (IT); Giorgio Marchetti, Florence (IT)

(73) Assignee: Nuovo Pignone Srl, Florence (IT)

( * ) Notice: Subject to any disclaimer, the term of this patent is extended or adjusted under 35 U.S.C. 154(b) by 112 days.

(21) Appl. No.: 14/891,058

(22) PCT Filed: May 12, 2014

(86) PCT No.: PCT/EP2014/059657
§ 371 (c)(1),
(2) Date: Nov. 13, 2015

(87) PCT Pub. No.: WO2014/184140
PCT Pub. Date: Nov. 20, 2014

(65) Prior Publication Data
US 2016/0096134 A1 Apr. 7, 2016

(30) Foreign Application Priority Data

May 14, 2013 (IT) .................. FI2013A0111

(51) Int. Cl.
*B01D 46/00* (2006.01)
*B01D 46/42* (2006.01)
(Continued)

(52) U.S. Cl.
CPC ....... *B01D 46/0026* (2013.01); *B01D 46/008* (2013.01); *B01D 46/0023* (2013.01);
(Continued)

(58) Field of Classification Search
CPC B01D 46/4227; B01D 46/0087; B01D 46/00; B01D 46/42; B01D 46/0068;
(Continued)

(56) References Cited

U.S. PATENT DOCUMENTS 4,515,609 A * 5/1985 Cuvelier .............. B01D 46/002
55/287
2008/0141636 A1 6/2008 Singh
(Continued)

FOREIGN PATENT DOCUMENTS

CN 101205834 A 6/2008
CN 101576006 A 11/2009
(Continued)

OTHER PUBLICATIONS

Unofficial English Translation of Italian Search Report issued in connection with corresponding IT Application No. FI2013A000111 dated Dec. 4, 2013.
(Continued)

*Primary Examiner* — Robert A Hopkins
*Assistant Examiner* — Minh-Chau Pham
(74) *Attorney, Agent, or Firm* — GE Global Patent Operation

(57) ABSTRACT

A filter system for filtering intake air of a gas turbine is presented. The filter system includes a first filter arrangement. The filter system further includes a second filter arrangement located downstream from the first filter arrangement and having a collection efficiency higher than a collection efficiency the first filter arrangement. Furthermore, the filter system includes a guard filter arrangement located between the first filter arrangement and the second filter arrangement, where a collection efficiency of the guard filter arrangement is lower than the collection efficiency of the first filter arrangement.

19 Claims, 3 Drawing Sheets

(51) Int. Cl.
*F01D 25/32* (2006.01)
*F02C 7/05* (2006.01)
*F02C 7/052* (2006.01)
*F02C 7/055* (2006.01)

(52) U.S. Cl.
CPC .......... *B01D 46/0068* (2013.01); *F02C 7/052* (2013.01); *F02C 7/055* (2013.01); *B01D 2279/60* (2013.01); *F05D 2220/32* (2013.01); *F05D 2230/60* (2013.01); *F05D 2230/70* (2013.01)

(58) Field of Classification Search
CPC . B01D 46/0019; B01D 46/0002; F01D 25/32; F02C 7/05
USPC .............. 55/485, 482.1, 322, 302, 323, 355; 95/283, 280, 287, 268
See application file for complete search history.

(56) References Cited

U.S. PATENT DOCUMENTS

| | | | |
|---|---|---|---|
| 2009/0229468 A1 | 9/2009 | Janawitz et al. | |
| 2010/0050873 A1* | 3/2010 | Hiner | B01D 46/0024 95/283 |
| 2010/0054919 A1* | 3/2010 | Hiner | B01D 45/08 415/121.2 |
| 2012/0204525 A1* | 8/2012 | Jarrier | F02C 7/055 55/385.7 |
| 2013/0232932 A1* | 9/2013 | Jarrier | F02C 7/05 55/483 |
| 2014/0165718 A1* | 6/2014 | Berkcan | G01F 1/6842 73/204.21 |
| 2014/0360370 A1* | 12/2014 | Eyers | B01D 50/002 95/268 |
| 2015/0101344 A1* | 4/2015 | Jarrier | F02M 35/082 60/796 |
| 2015/0114229 A1* | 4/2015 | Rout | B01D 46/008 95/286 |
| 2015/0219010 A1* | 8/2015 | Santini | F01D 25/002 60/39.092 |
| 2015/0238889 A1* | 8/2015 | Shellenberger | B01D 46/0068 55/301 |
| 2016/0084161 A1* | 3/2016 | Kippel | B01D 46/0068 55/302 |

FOREIGN PATENT DOCUMENTS

| | | |
|---|---|---|
| CN | 101660449 A | 3/2010 |
| CN | 102512884 A | 6/2012 |
| EP | 1086303 A1 | 3/2001 |
| JP | 2001263089 A | 9/2001 |
| RU | 2 280 772 C1 | 7/2006 |
| RU | 2 344 302 C2 | 1/2009 |
| WO | 9964735 A1 | 12/1999 |
| WO | 2012084892 A1 | 6/2012 |

OTHER PUBLICATIONS

A PCT Search Report and Written Opinion issued in connection with corresponding PCT Application No. PCT/EP2014/059657 dated Jul. 31, 2014.
"Light Hydrocarbon Plant Operators (vol. II)", China National Petroleum Corporation (CNPC) Personal Service Centre Petroleum Industry Press, 95th page.
Unofficial English translation of Office action and Search report issued in connection with corresponding CN Application No. 201480028133.8 dated Sep. 28, 2016.
Office Action and Search issued in connection with corresponding RU Application No. 2015147198 dated Feb. 16, 2018.

* cited by examiner

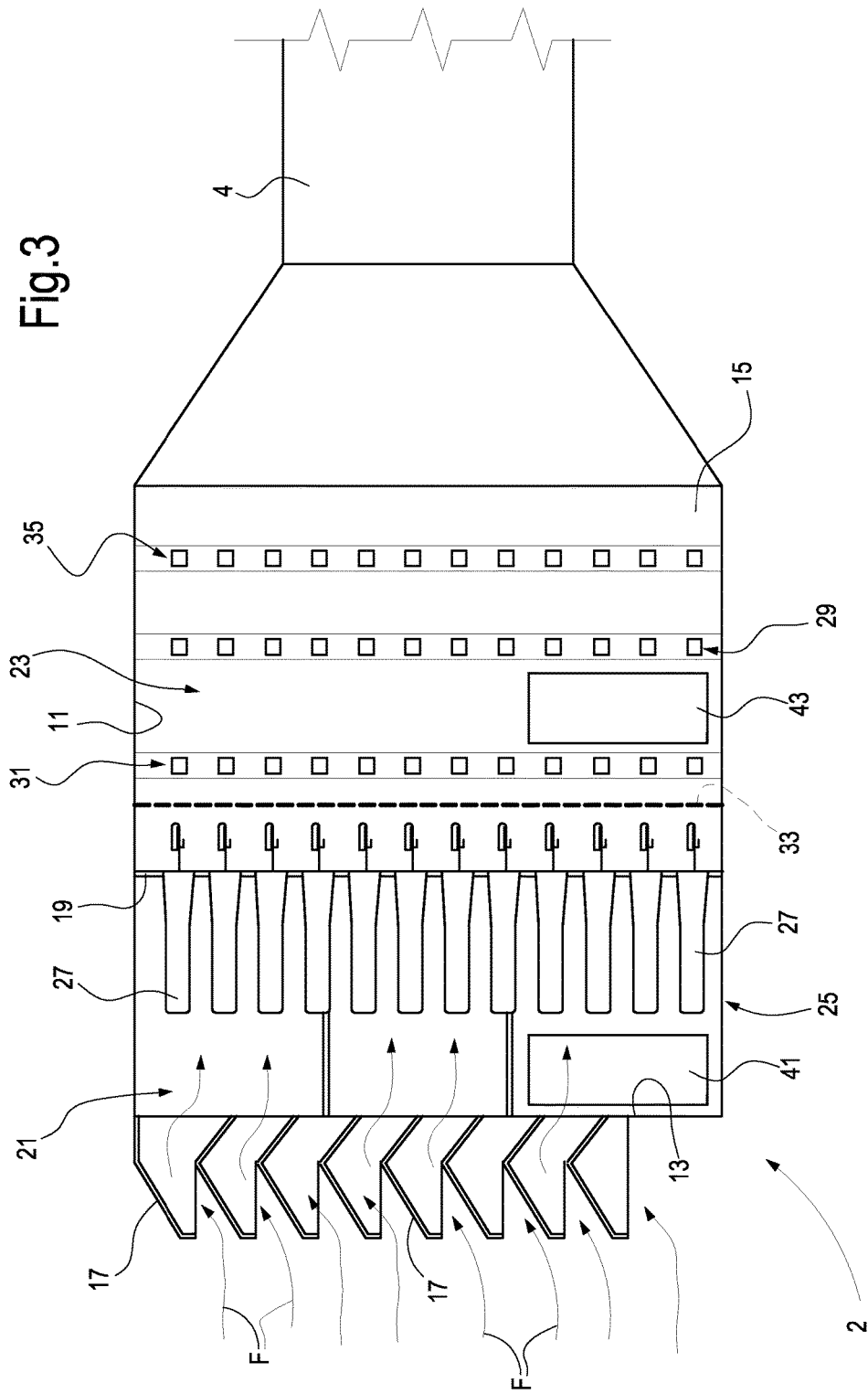

FILTERING CHAMBER FOR GAS TURBINES AND METHOD OF MAINTENANCE THEREOF

TECHNICAL FIELD

The present disclosure relates to filtering chambers and methods for maintaining the same. More specifically, the present disclosure relates to filtering chambers for gas turbines.

BACKGROUND

Gas turbines both for electric generation and mechanical drive applications operate in a variety of environments. In order to adapt the machines to the environment where they have to operate and realize their full potential in terms of performance and reliability, it is necessary to treat the air that they consume. Although the dust concentration in the atmosphere is normally very low, a gas turbine requires such a large quantity of air to operate that even a medium sized heavy duty or aero-derivative gas turbine could ingest some hundreds of kilograms of dust per year if no efficient filtering systems are provided.

The efficiency of the axial compressor of a gas turbine is a direct function of the smoothness of the rotating and stationary blade surfaces and the shape of the airfoil profiles. These surfaces can be roughened by corrosion and erosion; while the ingestion of substances, which adhere to the surfaces (fouling) will modify their shapes. Furthermore, the ingestion of contaminants may generate high temperature corrosion, plugging of cooling passages and particle fusion on the high temperature sections of the gas turbine.

In order to prevent or limit damages which can be caused to the various turbo-machinery components by dust contained in the combustion air ingested by the compressor, a filter system is usually arranged upstream of the air inlet plenum of the gas turbine engine.

FIG. 1 illustrates a gas turbine system 100 comprising a gas turbine engine and a filter system according to the current art. The gas turbine system 100 comprises a gas turbine engine 103 and a combustion air delivery system 105. The gas turbine engine 103 usually comprises a gas generator including a compressor 107 and a high pressure gas turbine 109. Downstream of the high pressure gas turbine 109 a power turbine or low pressure turbine 111 is arranged, which produces useful power to drive a load (not shown). In some embodiments, typically in heavy duty gas turbines, a single shaft gas turbine is provided, which drives the compressor and provides useful power to the load.

Combustion air is fed through the combustion air delivery system 105 to an air inlet plenum 113 upstream from the compressor 107. The combustion air delivery system 105 comprises a filter system 115. The filter system 115 usually comprises a chamber 116 with an air inlet side 117 and an air outlet side 119. Within chamber 116 a filter arrangement 122 is provided, which separates the chamber 116 in the upper volume 116U and a downstream volume 116D. Air entering the chamber 116 through a plurality of vertically arranged hoods 121 flows through the upstream volume 116U and is filtered through the filter arrangement 122. The filter arrangement 122 is comprised of a plurality of filter cartridges 123 supported by a partition wall 125. The filtered air exiting the filter arrangement 122 flows through the downstream volume 116D towards a duct 127 and is delivered to the air inlet plenum 113 of the gas turbine engine 103.

The filter arrangement 122 is usually a so-called pulse filter arrangement or pulse-jet filter arrangement, such as the one described in EP 1086303. The filter cartridges 123 are periodically cleaned by pulse jets of compressed air oriented in a direction opposite the normal air flow direction through the filter system 122. Dirt accumulated on the upstream side of the cartridges 123 is detached therefrom and falls down to the bottom of the chamber 116 where it can be removed.

The air filters and filter arrangements is determined by the efficiency of a filter arrangement in separating particles from the air flow. Filters are usually classified into groups and classes. The classification is based on results of measurements on separation capacity obtained by means of standardized methods. A group is defined on the basis of a unified measurement method and the same test parameters. A class within a group is defined on the basis of one lower threshold value or two (upper and lower) threshold values of a filter separation capacity in relation to the method of the group whereto the class belongs.

The collection efficiency of the filter arrangement 122 is usually limited to a class F9 according to EN779:2012 standards or MERV 15 according to ASHRAE 52.2 standards.

In some situations, it would be desirable to have a more performing filtering arrangement by providing a further filter stage downstream of the filter arrangement 122, for example an EPA or HEPA filter. These highly performing filters are extremely expensive and, due to their collection efficiency, must be provided with efficient upstream coarse filtering arrangements, to prevent clogging thereof.

The use of EPA or HEPA highly performing filters downstream of a pulse jet filter stage 122, as the one shown in FIG. 1, is not commonly adopted, because when the filter cartridges 123 of the first filter stage 122 require replacement, dirt accumulated on the upstream side of the filter system 123, 125 is dragged through the partition wall 125 when individual cartridges 123 are removed. Dirt entrained or dragged by the high air speed flow generated through the apertures left open by the temporarily removed cartridges 123 contaminates the downstream volume 116D and the EPA or HEPA filter arrangement downstream thereof. To prevent these drawbacks, filter replacement should be carried out after turning off the gas turbine. Turbine shut down, on the other hand, causes serious economic losses.

There is therefore a need for a more efficient filter system which can be subject to maintenance while the gas turbine engine 103 is online, i.e. while the gas turbine engine is operating, eliminating or alleviating the abovementioned problems.

SUMMARY OF THE INVENTION

According to a first aspect, embodiments of the subject matter disclosed herein provide for a filter system for filtering intake air of a gas turbine, comprising a first filter arrangement and a second filter arrangement, located downstream from the first filter arrangement and having higher collection efficiency than the first filter arrangement. A first guard filter arrangement, having lower collection efficiency than the first filter arrangement, is located between the first filter arrangement and the second filter arrangement. Replacement of cartridges or filter components of the first filter arrangement during turbine operation becomes thus possible without the risk of damaging or plugging the second filter arrangement, or the risk of contaminating the clean air plenum downstream the first filter arrangement, e.g. due to dirt carried over by the high-speed air flow generated by the removal of individual filter cartridges.

Dirt carried by the high-speed air flow passing through the air passage formed in the first filter arrangement by the removal of a filter cartridge or filter element is retained by the first guard filter arrangement, protecting the clean air plenum and the second filter arrangement located therein.

According to some embodiments, the first filter arrangement is a self-cleaning filter arrangement, for example a pulse jet filter arrangement.

According to some embodiments, a flow disturber can be located between the first filter arrangement and the first guard filter arrangement. A flow disturber can include a grid, net or mesh or any other mechanical structure capable of reducing the flow speed and the compactness of the air flow emerging from the first filter arrangement and directed towards the first guard filter. Risks of damages to the guard filter are thus prevented.

According to a further aspect, the subject matter disclosed herein concerns a gas turbine system comprising a gas turbine engine and a filter system as described above, including a first, coarser filter arrangement and a second, finer filter arrangement, with a guard filter there between.

According to a further aspect, the subject matter disclosed herein also concerns a method for the maintenance of a filter system configured to provide air to a gas turbine, the filter system comprising: a first filter arrangement, a second filter arrangement located downstream from the first filter arrangement and having a collection efficiency equal to or higher than the first filter arrangement, a first guard filter arrangement located between the first filter arrangement and the second filter arrangement and having a collection efficiency lower than the first filter arrangement; the method comprising the step of replacing filtration elements of the first filter arrangement, while the gas turbine is online, preventing dirt from the first filter arrangement from reaching the second filter arrangement by means of the first guard filter arrangement.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 3 illustrates a section of the filter system of FIG. 2.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
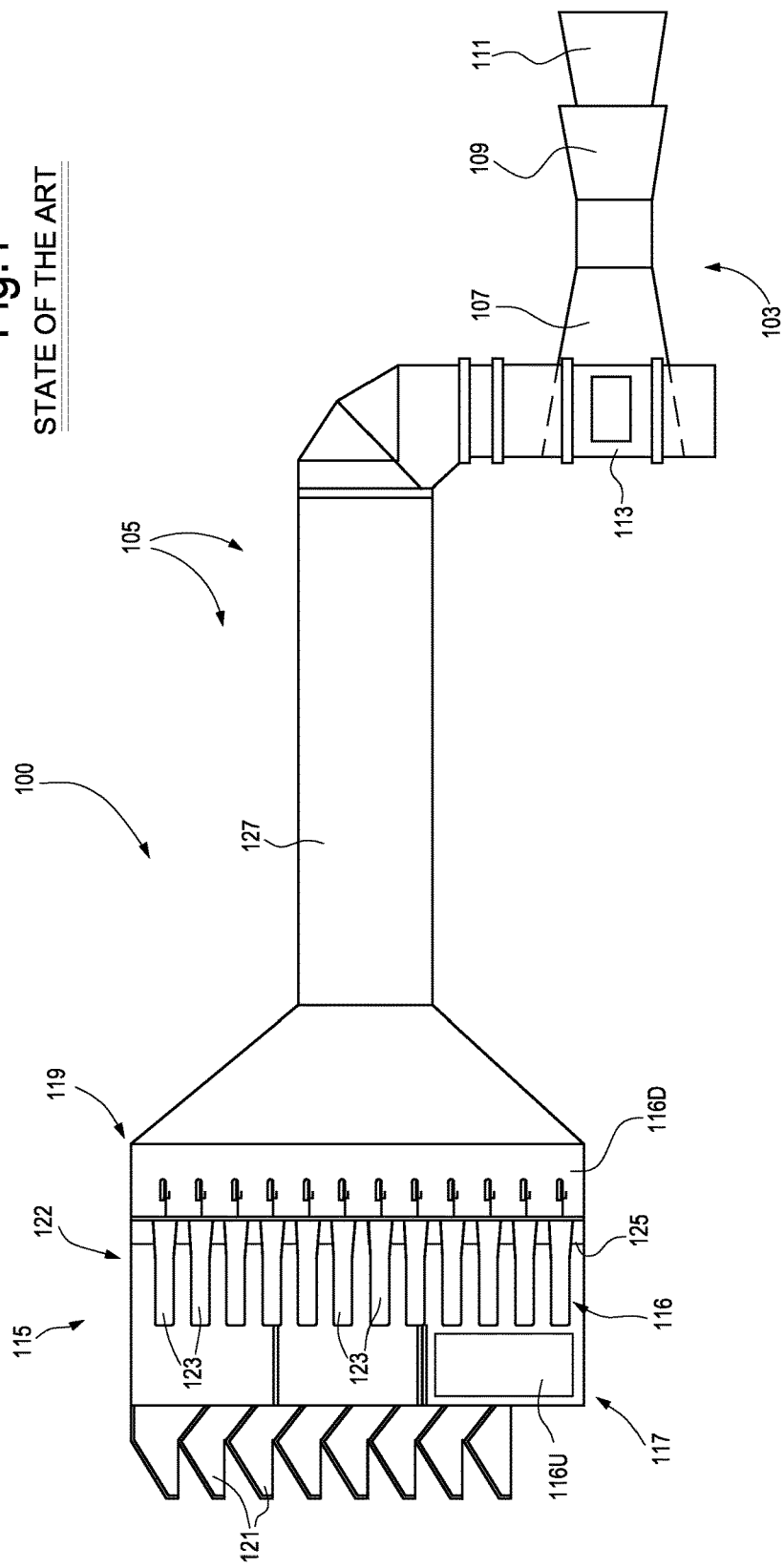
FIG. 1 illustrates a gas turbine arrangement with a filter system according to the current art.
Figure 2:
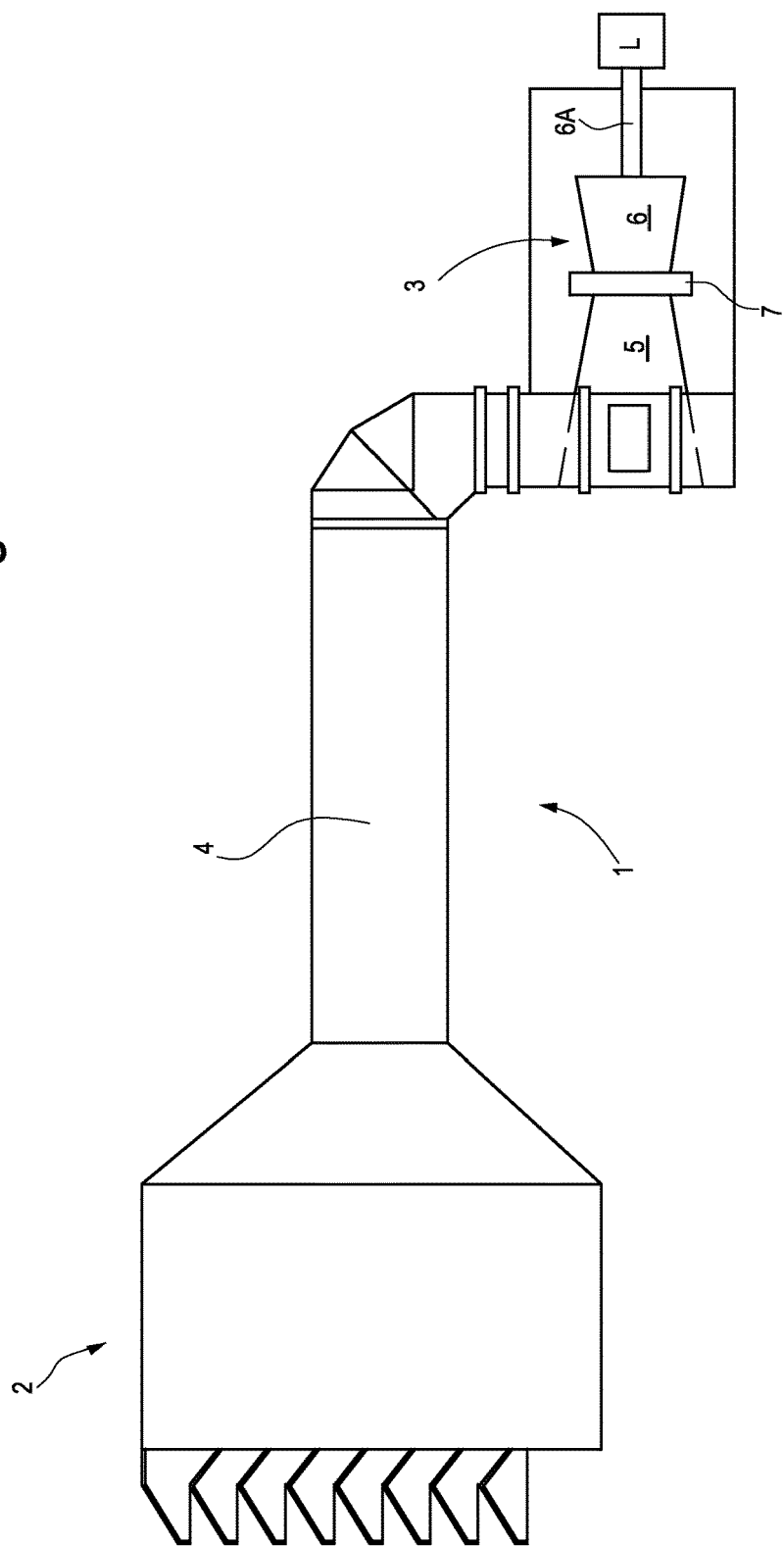
FIG. 2 illustrates a gas turbine and filter system according to the present disclosure.

FIG. 2 illustrates a gas turbine system 1 comprising a filter system 2 delivering combustion air to a gas turbine engine 3. A clean air delivery duct 4 connects the filter system 2 with the gas turbine engine 3. In some embodiments a gas turbine engine 3 comprises an axial compressor 5 and a gas turbine 6. The gas turbine engine can include a heavy duty gas turbine. In other embodiments, the gas turbine engine can include an aeroderivative gas turbine.

Clean combustion air delivered through the duct 4 is ingested by the compressor 5. The compressor 5 boosts the pressure of the air up to a value suitable for combustion in a combustor 7, wherein the compressed air is mixed with a liquid or gaseous fuel and the air-fuel mixture is ignited. Combustion gases are expanded in the turbine 6, which generates power to drive the compressor 5 and additional useful power available on a load coupling 6A for driving a load schematically shown at L. In an embodiment, the load L can comprise an electric generator, a centrifugal compressor or a compressor train, or any other load which can be driven by the gas turbine engine.

The structure of the filter system 2 is better shown in FIG. 3 which illustrates a vertical section of the filter system.

The filter system 2 comprises a filter chamber 11 having an air inlet side 13 and an air outlet side 15. An arrangement of vertically arranged inlet hoods, or other weather protection 17 is provided at the air inlet 13. Ambient air is sucked by the compressor 5 through the hoods 17 as shown by arrows F. Air is cleaned and filtered by filter arrangements within the filter chamber 11, described later on. Filtered, clean air is delivered through the air outlet 15 and duct 4 to the compressor 5 of the gas turbine engine 3.

According to some embodiments, a partition wall 19 arranged inside the filter chamber 11 divides the filter chamber 11 in an upstream volume 21 and in a downstream volume 23. The partition wall 19 forms part of a first filter arrangement globally labeled 25. In some embodiments the filter arrangement 25 is a self-cleaning filter arrangement. A self-cleaning filter arrangement is one which is provided with a system for periodically removing dirt, such as dust and particulate filtered out from the air flow which flows through the filter system 2, from filter media of the filter arrangement 25.

According to some embodiments, the filter arrangement 25 is a pulse filter arrangement or pulse jet filter arrangement. The filter arrangement 25 can comprise a plurality of filtering cartridges 27 individually supported on the partition wall 19. As known from the background art, the partition wall 19 can be provided with a plurality of seats, each of which houses one of the cartridges 27. The cartridges 27 can be individually removed from the relevant aperture and replaced once exhausted.

The filter cartridges 27 can be fine dust filters belonging to group F as defined by EN779-2012 standards. According to some embodiments, the filter cartridges 27 can have a collection efficiency according to class F8 or F9 of EN779-2012 standards, i.e. a MERV 14 or MERV 15 rating according to ASHRAE 52.2 standards.

The upstream volume 21 is a dirt air volume where unfiltered air enters and where the first filtration step takes place. Depending upon the class of filter cartridges 27, particulates entrained by the air flow within a certain dimensional range are captured by the filter cartridges 27 of the filter arrangement 25 and collect on the outer surface of the cartridges.

If the filter arrangement 25 is a self-cleaning system, for example a pulse jet filter arrangement, the dirt collected on the filter cartridges 27 is from time to time removed by pulse jets impinging against each filter cartridge 27 in a direction opposite the normal airflow direction through the filter system 25. The dirt removed from the filter cartridges 27 falls down to the bottom of the upstream volume 21 and can be removed through an aperture (not shown).

Partially filtered or pre-filtered air flows through the partition wall 19, within the downstream volume 23. A second filter arrangement schematically shown at 29 can be arranged in the downstream volume 23. In an embodiment, the second filter arrangement 29 has a collection efficiency higher than the first filter arrangement 25.

According to some embodiments, the second filter arrangement 29 can comprise filter elements or filter cartridges belonging the EPA (Efficient Particulate Air filters) class or to HEPA (High Efficiency Particulate Air filters) class, i.e. to group E or H as defined in EN1822-2009 standards. In some further embodiments the filter system 29 can comprise ultra-high efficiency particulate air filters (ULPA) in class U according to EN1822-2009. According to some embodiments, currently collection efficiency values for the filter arrangement 29 are class E10 through E12 according to EN1822-2009 standards.

The filter arrangement 29 can include more than one filtration stage, for example two filtration stages in sequence with increasing collection efficiency in the flow direction.

Between the first filter arrangement 25 and the second filter arrangement 29 a first guard filter arrangement 31 is located. A guard filter arrangement, as disclosed herein, is a filter arrangement having a collection efficiency lower than the collection efficiency of the immediately upstream filter arrangement and is used as a temporary filtration device for preventing the penetration of dust in the duct 4 when filter elements or components of the upstream filter arrangement are replaced during a maintenance cycle, for example, while the gas turbine engine is online.

According to some embodiments, therefore, the first guard filter arrangement 31 has a collection efficiency lower than the collection efficiency of the pulse jet filter arrangement 25. If the latter is a class F9 filter arrangement according to EN779-2012 standards (MERV rating 15 according to ASHRAE 52.2 standard), the first guard filter arrangement 31 can have a coarse dust filter capacity or a fine dust filter capacity. In some embodiments the first guard filter arrangement 31 is a class G3 filter arrangement or more particularly a class G4 filter arrangement, according to EN779-2012 standards, corresponding to a MERV rating 7 according to ASHRAE 52.2 standards. According to other embodiments, the first guard filter arrangement 31 is a class M5 or M6 filter arrangement, according to EN779-2012 standards, i.e. MERV rating 9 and MERV rating 11 according to ASHRAE 52.2 standards, respectively.

In some embodiments, the first guard filter arrangement 31 is arranged at a distance from the first filter arrangement 25 sufficient to house an intermediate flow disturber 33 located between the first filter arrangement 25 and the first guard filter arrangement 31. According to some embodiments the flow disturber 33 can comprise an apertured wall, a grid, or a net having a flow cross section sufficient to reduce the speed of a high speed air flow which generates when individual filter cartridges 27 of the first filter arrangement 25 are removed for maintenance or replacement purposes. The flow section of the flow disturber is however sufficiently large to generate a negligible pressure drop there across during normal operating conditions, i.e. when the air flow speed through the filter chamber 2 is limited, e.g. to 10 m/s or lower, more particularly to 5 m/s or lower.

According to some embodiments, a second guard filter 35 is arranged in the chamber 29, downstream from the second filter arrangement 29. The second guard filter 35 has a lower collection efficiency than the second filter arrangement 29. In some embodiments, for example, the second guard filter 35 can have substantially the same collection efficiency as the first guard filter 31. The second guard filter 35 can thus belong to class G4 or M5 or M6 as defined by EN779-2012 standards, corresponding to MERV 7 or MERV 9 or MERV 11 according to ASHRAE 52.2 standards.

The upstream volume 21 can be provided with a first access door 41, which allows entrance of maintenance staff in the upstream volume 21. A second door 43 can be provided for getting access to the downstream volume 23 for maintenance purposes.

The above described arrangement of filter stages allows an extremely efficient filter system to be obtained, with collection efficiency values up to for example class E10, E11 or E12 of EN1822-2009 standards or above, due to the use of a second, highly efficient filter stage 29. As will become apparent from the following description of a possible maintenance method, the provision of the first guard filter 31 protects the second filter arrangement 29 from becoming clogged by dirt entrained by the air flow during replacement of filtration cartridges or elements 27 of the first filter arrangement 25. The second guard filter arrangement 35 on the other hand allows replacement of individual filter cartridges or filter elements of the second filter arrangement 29. Both replacement operations on the first filter arrangement 25 and on the second filter arrangement 29 can be performed with the gas turbine engine 3 online, i.e. while the gas turbine engine is operating.

A possible sequence of maintenance steps is now described by way of example.

According to some embodiments, the pressure drop across the first filter arrangement 25 under normal operating conditions ranges from 250 Pa (new filter cartridges) to 1500 (exhausted filter cartridges requiring replacement).

When the filter cartridges 27 of the first filter arrangement 25 require replacement, e.g. because the maximum allowable pressure drop has been achieved, due to exhaustion of the filter cartridges, maintenance staff can enter the upstream volume 21 through door 41. Before replacing the filter cartridges 27, the latter can be cleaned by pulse jets to remove the major part of the dust particles collected on the outer surface of the filter cartridges 27.

Under normal operating conditions, when all the cartridges 27 are mounted on the partition wall 19, the air speed through the filter system 2 is around 1-5 m/s, more particularly around 2-3 m/s.

Since replacement of the filter cartridges is performed with the gas turbine engine under operating conditions, i.e. with the compressor 5 online, when an individual cartridge 27 is removed from the partition wall 19, the sudden drop in the flow resistance caused by the removal of the filter cartridge provokes a localized strong increase of the air speed, which causes possible dust particles or other dirt material deposited on the partition wall 19 around the aperture, from which the cartridge 27 has been removed, to be entrained by the air flow into the downstream volume 23. The first guard filter 31 prevents such entrained dust particulate from reaching the second filter arrangement 29. It is thus possible to remove sequentially all the filter cartridges 27 of the first filter arrangement 25 safeguarding the highly expensive filter arrangement 29.

In order to prevent the kinetic energy of the concentrated high-speed air flow, which is generated through the apertures wherefrom the cartridges 27 are individually removed, from damaging the guard filter 31, the flow disturber 33 can be provided. This flow disturber 33 breaks and slows down the high-speed air flow so that downstream of the flow disturber 33 the air speed and the kinetic energy thereof are reduced and the impact thereof on the guard filter 31 will not cause damages.

According to some embodiments, in order to check whether the replaced cartridges 27 have been correctly seated in the respective apertures of the partition wall 19, to avoid malfunctioning of the filter arrangement, a lighting system can be provided downstream from the partition wall 19. Once the cartridges 27 have been set in place, the operators can lit the lighting system and check whether light is visible from the side of the partition wall 19 facing the air inlet. Light radiation passing through the partition wall 19 indicates a clearance between the partition wall 19 and the cartridge(s) 27, i.e. requiring correct-repositioning of the cartridge(s) 27.

According to some embodiments, the maintenance method can also include a further phase of replacement of the cartridges or elements of the second filter arrangement 29. Once the filter cartridges 27 of the first filter arrangement 25 have been removed and replaced, maintenance staff can exit the upstream volume 21 of the filter chamber 11 and close the door 41. Access to the downstream volume 23 is obtained through door 43. In an embodiment, this can be done after replacement of the filter cartridges 27 of the first filter arrangement 25. The new filter cartridges installed in filter arrangement 25 reduce the pressure drop across the first filter arrangement and thus the pressure difference between the interior of volume 23 and the external environment, making access to the downstream volume 23 easier.

Once accessed the downstream volume 23 of the chamber 11, the maintenance staff can replace the filter cartridges or filter elements of the second filter arrangement 29. In so doing, extraneous material, dust or dirt accidentally flowing through the second filter arrangement 29 in the location where the filter cartridges are removed for replacement are prevented from entering the duct 4 by the second guard filter 35.

Under normal operative conditions, replacement of the filter cartridges 27 of the first filter arrangement 25 is performed more frequently than the replacement of the filter elements or filter cartridges of the second filter arrangement 29. Thus, in some embodiments the maintenance method will include only the method steps disclosed above in connection with the replacement of the filter cartridges 27 of the first filter arrangement 25. In some embodiments, conversely, the maintenance method will include also the steps disclosed in connection with the replacement of the filter cartridges or filter elements of the second filter arrangement 29.

The use of the first guard filter 31 protects the second filter arrangement 29 against pollution from dirt and particulate detached from the structure of the first filter arrangement 25 during the replacement operation of the filter cartridges 27. The use of relatively expensive and highly efficient filter cartridges having a higher collection efficiency than the first filter arrangement 25, e.g. EPA or HEPA filters, becomes thus viable, resulting in higher performance of the gas turbine engine 3 and reduced need for compressor and turbine washing.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A filter system for filtering intake air of a gas turbine, the system comprising:
    a first filter arrangement;
    a second filter arrangement, located downstream from the first filter arrangement and having a collection efficiency higher than a collection efficiency of the first filter arrangement; and
    a first guard filter arrangement located between the first filter arrangement and the second filter arrangement, wherein a collection efficiency of the first guard filter arrangement is lower than the collection efficiency of the first filter arrangement, and wherein the first guard filter arrangement is configured to protect the second filter arrangement while replacing the first filter arrangement during a maintenance cycle when the gas turbine is online.

2. The filter system of claim 1, wherein the first filter arrangement is a self-cleaning filter arrangement.

3. The filter system of claim 1, wherein the first filter arrangement is a pulse jet filter arrangement.

4. The filter system of claim 1, wherein a flow disturber is located between the first filter arrangement and the first guard filter arrangement.

5. The filter system of claim 1, wherein a second guard filter arrangement, having a collection efficiency lower than the collection efficiency of the second filter arrangement, is located downstream from the second filter arrangement.

6. The filter system of claim 1, wherein the first filter arrangement and the second filter arrangement are located in a filter chamber having an air inlet side and an air outlet side, wherein the first filter arrangement divides the filter chamber into an upstream volume and a downstream volume and wherein the first guard filter arrangement is arranged in the downstream volume.

7. The filter system of claim 6, wherein a flow disturber is arranged in the downstream volume, between the first filter arrangement and the first guard filter arrangement.

8. The filter system of claim 6, wherein a first door is provided for entering the upstream volume and a second door is provided for entering the downstream volume.

9. The filter system of claim 1, wherein the second filter arrangement is an efficient particulate air (EPA) filter arrangement or a high efficiency particulate air (HEPA) filter arrangement.

10. The filter system of claim 1, wherein the collection efficiency of the first filter arrangement is class F7 or above.

11. The filter system of claim 1, wherein the collection efficiency of the second filter arrangement is class E10 or above.

12. The filter system of claim 1, wherein the collection efficiency of the first guard filter arrangement is class G4 or above.

13. A gas turbine system comprising a gas turbine engine and a filter system according to claim 1, in fluid communication with the gas turbine engine.

14. A method for maintenance of a filter system configured to provide air to a gas turbine, the filter system comprising: a first filter arrangement, a second filter arrangement located downstream from the first filter arrangement and having a collection efficiency equal to or higher than a collection efficiency of the first filter arrangement, a first guard filter arrangement located between the first filter arrangement and the second filter arrangement, wherein a collection efficiency of the first guard filter arrangement is lower than the collection efficiency of the first filter arrangement, the method comprising the step of:
    replacing filtration elements of the first filter arrangement, while the gas turbine is online, and protecting the second filter arrangement by preventing dirt from the first filter arrangement from reaching the second filter arrangement by means of the first guard filter arrangement.

15. The method of claim 14, further comprising the steps of:
    providing a flow disturber between the first filter arrangement and the first guard filter arrangement; and
    slowing down an air flow from the first filter arrangement towards the first guard filter arrangement by means of the flow disturber during the step of replacing the filtration elements of the first filter arrangement.

16. The method of claim 14, further comprising the steps of:
    providing a guard filter downstream from the second filter arrangement; and
    after replacing the filtration elements of the first filter arrangement, replacing filtration elements of the second filter arrangement, while preventing dirt or extraneous matter from exiting the filter system by means of the second guard filter arrangement.

17. A method for the maintenance of a filter system configured to provide air to a gas turbine, the filter system comprising: a filter chamber with an air inlet and an air outlet, a first filter arrangement having a first collection efficiency located in the filter chamber, a second filter arrangement having a second collection efficiency or equal to or higher than a collection efficiency of the first collection efficiency and located in the filter chamber downstream from the first filter arrangement, a first guard filter arrangement located in the filter chamber between the first filter arrangement and the second filter arrangement, wherein a collection efficiency of the first guard filter arrangement is lower than the collection efficiency of the first filtration arrangement, the first guard filter arrangement dividing the filter chamber into an upstream volume and a downstream volume, a second guard filter arrangement between the second filter arrangement and the air outlet, the second guard filter arrangement having a collection efficiency lower than the collection efficiency of the second filtration arrangement; the method comprising the steps of:
    opening the upstream volume;
    entering the upstream volume;
    replacing filtration elements of the first filter arrangement, and protecting the second filter arrangement by preventing dirt from the first filter arrangement from reaching the second filter arrangement by means of the first guard filter arrangement,
    exiting the upstream volume;
    closing the upstream volume;
    opening the downstream volume;
    entering the downstream volume; and
    replacing filtration elements of the second filter arrangement, while preventing extraneous matter or dirt from exiting the filter chamber by means of the second guard filter arrangement;
    the steps being performed while the gas turbine is online.

18. The method of claim 17, further comprising the following steps:
    providing a flow disturber between the first filter arrangement and the first guard filter arrangement; and
    slowing an air flow from the first filter arrangement towards the first guard filter arrangement by means of the flow disturber during replacement of filtration elements of the first filter arrangement.

19. The method of claim 17, further comprising the step of: replacing filtration elements of the first guard filter arrangement after replacing filtration elements of the first filter arrangement.

* * * * *